United States Patent [19]
Jancaitis et al.

[11] Patent Number: 4,799,233
[45] Date of Patent: Jan. 17, 1989

[54] FLASHLAMP RADIATION RECYCLING FOR ENHANCED PUMPING EFFICIENCY AND REDUCED THERMAL LOAD

[75] Inventors: Kenneth S. Jancaitis, Pleasant Hill; Howard T. Powell, Livermore, both of Calif.

[73] Assignee: The United States of America as represented by the United States Department of Energy, Washington, D.C.

[21] Appl. No.: 922,424

[22] Filed: Oct. 23, 1986

[51] Int. Cl.$^4$ .............................. H01S 3/092
[52] U.S. Cl. ............................ 372/70; 372/72; 372/76; 313/112; 313/635
[58] Field of Search ............... 372/72, 70, 76; 313/112, 635

[56] References Cited

U.S. PATENT DOCUMENTS

| | | | |
|---|---|---|---|
| 4,225,826 | 9/1980 | Lewis et al. | 372/70 |
| 4,227,113 | 10/1980 | Walsh | 313/112 |
| 4,652,789 | 4/1987 | Kawakatsu et al. | 313/112 |

FOREIGN PATENT DOCUMENTS

0084762  5/1985  Japan .......................... 313/112

*Primary Examiner*—William L. Sikes
*Assistant Examiner*—Xuan Thi Vo
*Attorney, Agent, or Firm*—Gary C. Roth; Clifton E. Clouse, Jr.; Judson R. Hightower

[57] ABSTRACT

A method for recycling laser flashlamp radiation in selected wavelength ranges to decrease thermal loading of the solid state laser matrix while substantially maintaining the pumping efficiency of the flashlamp.

3 Claims, 9 Drawing Sheets

FLASHLAMP RADIATION RECYCLING FOR ENHANCED PUMPING EFFICIENCY AND REDUCED THERMAL LOAD

The United States Government has rights in this invention pursuant to Contract No. w-7405-ENG-48 between the U.S. Department of Energy and the University of California for the operation of Lawrence Livermore National Laboratory.

FIELD OF THE INVENTION

This invention relates to techniques for efficient radiative pumping of lasers using flashlamps.

BACKGROUND OF THE INVENTION

The possibility of increasing the laser pumping efficiency of a flashlamp by recycling flashlamp radiation below a certain wavelength has been discussed theoretically by V. M. Gardashyan et al, Soviet Jour. Quant. Elektr. 1 296 (1971), and by I. I. Litvinov et al, Soviet Jour. Quant. Elektr. 4 131 (1974) and has been examined experimentally for one situation by S. A. Baranov et al, Soviet Jour. Quant. Elektr. 8 102 (1978). However, no published work has appeared on control of thermal load generated in a solid state matrix of a laser, or on joint control of pumping efficiency and thermal load generation, through use of wavelength-selective coatings on the flashlamp envelope. The subject invention achieves such control or joint control.

A laser flashtube, discussed briefly by Karney in U.S. Pat. No. 3,582,822, uses a wavelength-selective coating on a flashlamp/laser rod window to admit only higher wavelength radiation to enhance absorption of the transmitted flashlamp radiation by the narrow pump bands of the laser rod material. No quantitative data are given in support of the approach, and the tradeoff between laser rod pumping and laser rod heating (at adjacent wavelengths) is not discussed.

Crow, in U.S. Pat. No. 3,634,779, discloses use of an impregnated flashlamp jacket and uv-absorbing filter that is positioned within the laser rod material to suppress transverse radiative emissions at the laser wavelength; this suppresses depumping of the inverted quantum population within the rod. A second, similar filter may be positioned between the laser rod and the flashlamp; and a third filter may be positioned within the flashlamp jacket material to absorb radiation at uv. and lower wavelengths. Recycling of radiation in specified wavelength ranges within the flashlamp itself is not discussed or, apparently, even contemplated.

U.S. Pat. No. 4,039,970, issued to Shiroki, Mori and Kuwano, discloses use of a radiation filter that absorbs all wavelengths $\lambda < 5000$ Å, positioned between the initial radiative source and the laser material to be pumped. The removal, rather than recycling, of all flashlamp radiation of wavelengths below $\lambda = 4,500-5,000$ Å decreases the input energy required to reach laser oscillation threshold (approximately 1.1 Joules for a $YAlO_3$ crystal) and increases the laser output energy for a fixed input of about 10 Joules.

Broadt, in U.S. Pat. No. 4,399,490, discloses the use of suitable electromagnetic radiation reflectors, backed by opaque, radiation-absorbing materials, to substantially reduce the back radiation from a flashlamp reflector. This approach seeks to suppress transmission of electromagnetic radiation at all wavelengths rather than to recycle radiation in selected wavelength ranges.

SUMMARY OF THE INVENTION

One object of the invention is to provide method and apparatus for suppressing or eliminating the radiation emitted by a flashlamp below a predetermined wavelength.

Another object of the invention is to provide method and apparatus for increased relative pumping efficiency for a solid state laser.

Another object of the invention is to provide method and apparatus for reducing the thermal load on the solid state matrix of a flashlamp-pumped laser while maintaining, or minimizing the loss of, pumping efficiency.

Other objects of the invention and advantages thereof, will become clear by reference to the detailed description and the accompanying drawings.

To achieve the foregoing objects in accordance with the invention, the method in one embodiment may comprise: providing a flashlamp having an envelope that is substantially transparent to the flashlamp radiation, adjacent to a solid state laser to be pumped; and providing an optical coating on the exterior or interior surface of the flashlamp that reflects a substantial portion of all radiation with wavelengths less than a predetermined wavelength $\lambda_c$ and transmits substantially all radiation with wavelengths $\lambda > \lambda_c$.

The method in a second embodiment is similar to the above-mentioned embodiment except that the optical coating also reflects substantially all radiation with wavelengths greater than a second predetermined wavelength $\lambda_d$ with $\lambda_c < \lambda_d$.

DETAILED DESCRIPTION

Flashlamp pumping efficiency for a given (solid state) laser, defined as the ratio of radiative energy emitted by the laser to electrical energy delivered to the flashlamp, is often 5-20 percent; but the flashlamp radiative efficiency component is quite high, often of the order of 75 percent. The flashlamp itself is thus a very efficient converter of electrical energy to radiative energy. Once a plasma is formed by the electrical energy, further heating of the plasma by electrical means or by optical (radiative) means may be equally efficient.

In a flashlamp-pumped solid state laser, such as Nd:YAG- or Nd:glass, one may divide the initial flashlamp radiation into three mutually exclusive wavelength regions: (1) $\lambda < \lambda_1$, where the pump radiation may be absorbed by and heat the solid state matrix without pumping the dopant; (2) $\lambda_1 \leq \lambda \leq \lambda_2$, where the radiation pumps the dopant primarily; and (3) $\lambda > \lambda_2$, where the radiation cannot pump the dopant and is usually not absorbed by the solid state matrix. For Nd:YAG, $\lambda_1 = 0.37$ μm and $\lambda_2 = 0.94$ μm. If one can capture the unused radiation in wavelength regions (1) and (3), one can return it to the flashlamp plasma and, in principle, increase the flashlamp pumping efficiency by recycling the radiation to all wavelengths. Furthermore, the short wavelength radiation $\lambda < \lambda_1$ contributes substantially to the solid state matrix heat load but contributes nothing to pumping of the dopant. In addition, even for wavelengths longer than $\lambda_1$ it may be desirable to recycle the shorter wavelength radiation inside the flashlamp, shifting it to longer wavelengths in the pump band and minimizing the thermal load delivered to the laser medium. The heat load on the matrix, and the necessity of removal of this heat, limits the repetition rate at which the laser operates. With a conventional approach, the repetition rates for an Nd:YAG laser and an Nd:glass laser are typically 10 Hz. and 1 Hz., respectively. Reducing the heat load by 50 percent could double these rates.

The subject invention uses a reflective coating on the exterior (or interior) surface of the flashlamp envelope or container to redeposit some of the short wavelength radiation ($\lambda < \lambda_1$) directly in the flashlamp plasma for re-emission at higher wavelengths. The invention also replaces the low wavelength cut-off at $\lambda = \lambda_1$ by a similar cut-off at a higher wavelength $\lambda = \lambda_c$ to reduce the solid state matrix heat load with minimal loss in pumping efficiency through loss of use of radiation in the range $\lambda_1 \leq \lambda \leq \lambda_c$.

For an initial assessment of modification of pumping efficiency in the presence of optical recycling, it is assumed that the reflective optical coating reflects all radiation of wavelengths $\lambda < \lambda_c$ and transmits all radiation of higher wavelengths. The flashlamp envelopes do not transmit appreciably below 0.2 μm wavelengths. If $f(P_e, \lambda)$ is the normalized flashlamp output spectrum for radiative emission of wavelength $\lambda$ in response to input of electrical pump energy $P_e$, one has $$\int_0^\infty f(P_e, \lambda) d\lambda = 1;$$

and the single-pass pump efficiency $\eta_{pump}(P_e)$ in the absence of recycling, corresponding to the radiation efficiency $\eta_{rad}(P_e)$, is given by $$\eta_{pump}(P_e) = \eta_{rad}(P_e) \int_0^\infty f(P_e, \lambda)[1 - \exp(-\sigma(\lambda)\rho w)] \frac{\lambda}{\lambda_0} d\lambda, \quad (1)$$

$\sigma(\lambda)$ = wavelength-dependent matrix absorption cross-section
$\rho w$ = matrix doping-thickness product,
$\lambda_0$ = output radiative wavelength.

The amount of neat deposited in the matrix material is approximately $$P_h(P_e) = \quad (2)$$

$$P_e \eta_{rad}(P_e) \int_0^\infty f(P_e, \lambda)[1 - \exp(-\sigma(\lambda)\rho w)] \left(1 - \frac{\lambda}{\lambda_0}\right) d\lambda$$

If one assumes that the electrical power initially deposited in the flashlamp, and the radiative power redeposited in the plasma, produce radiation with the same efficiency, the total power deposition $P_T$, correct to all orders of redeposition, is determined by $$P_T = P_e + \eta_{rad}(P_T) f_{rec}(P_T) P_T, \quad (3)$$

where $f_{rec}(P_T)$ is the recycled energy fraction.

We have modeled the reflectivity of the flashlamp coating by assuming 100 percent transmission for $\lambda > \lambda_c$ and 100 percent reflection for $\lambda < \lambda_c$, by assuming that no radiation is absorbed in the coating, and by assuming that all reflected radiation is absorbed in the plasma; in practice, use of any coating material with at least 50 percent reflection/transmission will offer some improvement. The recycled energy fraction then becomes $$f_{rec}(P_T) = \int_0^{\lambda_c} f(P_T, \lambda) d\lambda, \quad (4)$$

and the model prediction for single-pass pumping efficiency becomes $$\eta'_{pump}(P_e) = \quad (5)$$

$$\frac{P_T}{P_e} \eta_{rad}(P_T) \int_{\lambda_c}^\infty f(P_T, \lambda)[1 - \exp(-\sigma(\lambda)\rho w)] \frac{\lambda}{\lambda_0} d\lambda$$

Equation (2) for matrix heat load requires a similar modification to account for the effects of flashlamp radiation recycling or feedback. with this modification incorporated, the average amount of heat generated in the matrix for each excitation is given by $$\epsilon(P_e) =$$

$$\frac{\eta_{rad}(P_T)}{\eta'_{pump}(P_e)} \int_0^\infty f(P_T,$$

$$\lambda)[1 - \exp(-\sigma(\lambda)\rho w)] \frac{hc}{\lambda_0} (1 - \lambda/\lambda_0) d\lambda$$

Figure 1:
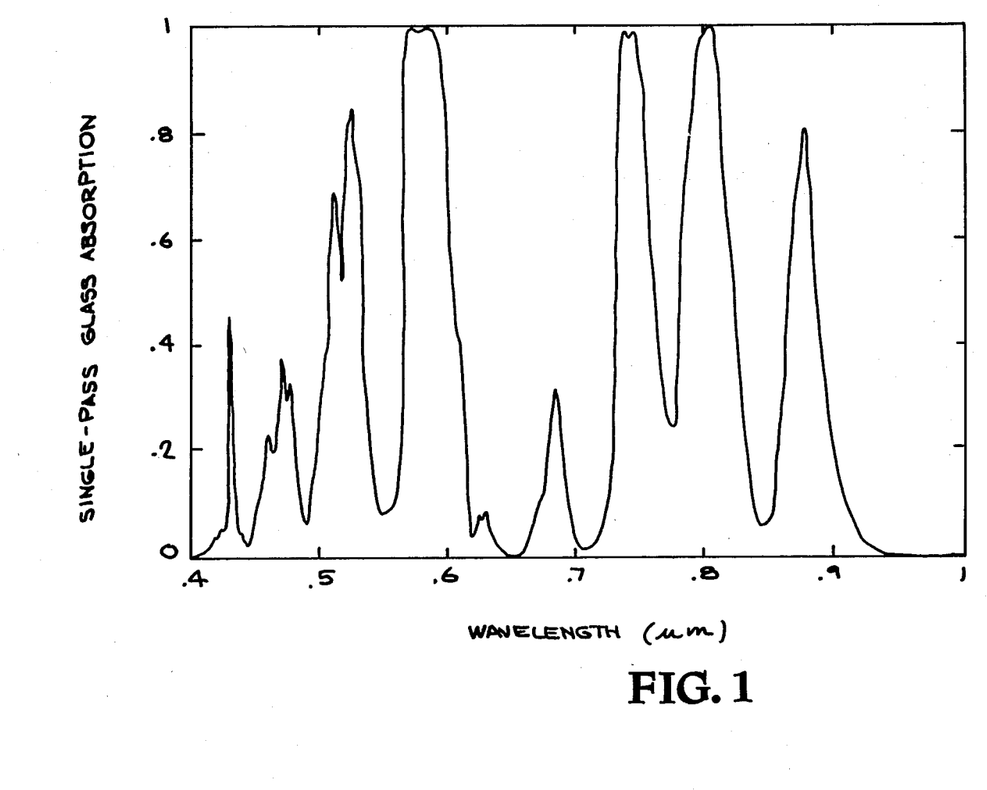
FIG. 1 is a graphic view of single-pass absorption of optical radiation in Nd:glass as a function of radiation wavelength, for doping-thickness product $\rho w = 4 \times 10^{20}$ ions/cm$^2$.

The preceding analysis was carried out for absorption in LG-660 laser glass at two values for the doping-thickness product, corresponding to typical values for the cases of a high average power laser ($\rho w = 4.0 \times 10^{20}$ ions cm$^{-2}$) and for a fusion laser application $\rho w = 1.64 \times 10^{21}$ ions cm$^{-2}$), both using Nd:glass. For the former case, the single-pass Nd absorption is plotted as a function of wavelength in FIG. 1. Both the Nd* single-pass pumping efficiency and the glass thermal deposition were calculated for values of the cut-off wavelength from 400 to 700 nm (in steps of 50 nm), as well as for the standard case assuming no recycling. The flashlamp spectral emission and radiant efficiency data used for these calculations are given in the Lawrence Livermore National Laboratory Laser Program Annual Report for 1984 (UCRL-50021-84), pp 6-13–6-17. A smoothed spline-fit to the results of the recycling analysis at the discrete input energies produced the curves plotted here. The single-pass absorption in FIG. 1 is computed as a weighted average of absorption for a thin sample, where the absorption peaks are most nearly correct, and for a thick sample, where the "wings" of the absorption bands are more correctly represented.

Figure 2:
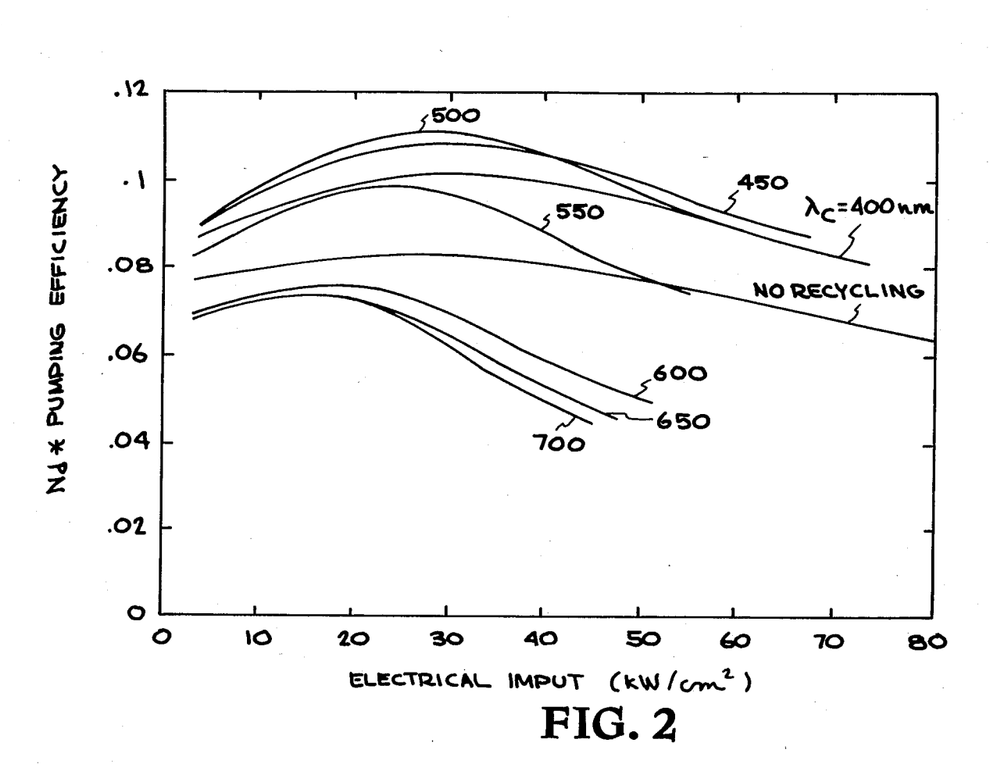
FIG. 2 is a graphic view of calculated Nd* ion pumping efficiency in glass as a function of electrical input for a sequence of relative cutoff wavelengths $\lambda_c$ for doping-thickness product of $4 \times 10^{20}$ ions/cm$^2$, together with the efficiency that would result if none of the radiation was recycled.
Figure 3:
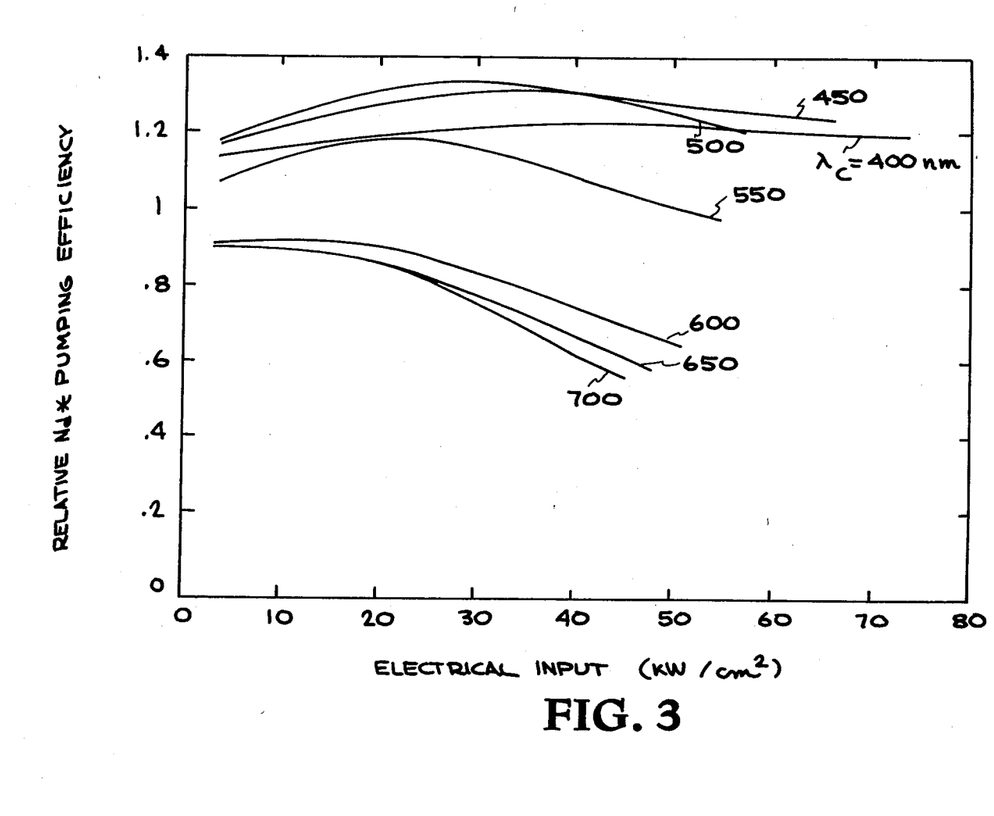
FIG. 3 is a graphic view of calculated Nd* single pass relative pumping efficiency in glass (efficiency ratio with and without recycling of all photons with wavelengths $\lambda < \lambda_c$).

The calculated pumping efficiencies as a function of the electrical input are shown in FIG. 2 for the doping-thickness product of $4 \times 10^{20}$ ions cm$^{-2}$. For purposes of comparison, the relative pumping efficiency (defined as the ratio of the pumping with feedback to the pumping without feedback at given electrical input power) is also shown in FIG. 3. Over most of the range of electrical loadings the highest efficiencies were obtained with $\lambda_c = 500$ nm, as the weak absorption band at 475 nm is important only at the highest powers when the lamp output is significantly blue-shifted. However, any $\lambda_c$ in the range 400–700 nm may suffice. As the cut-off wavelength is increased beyond 500 nm, the pumping efficiency falls slowly because radiation which could have pumped Nd directly is then recycled with less than unity efficiency.

Figure 4:
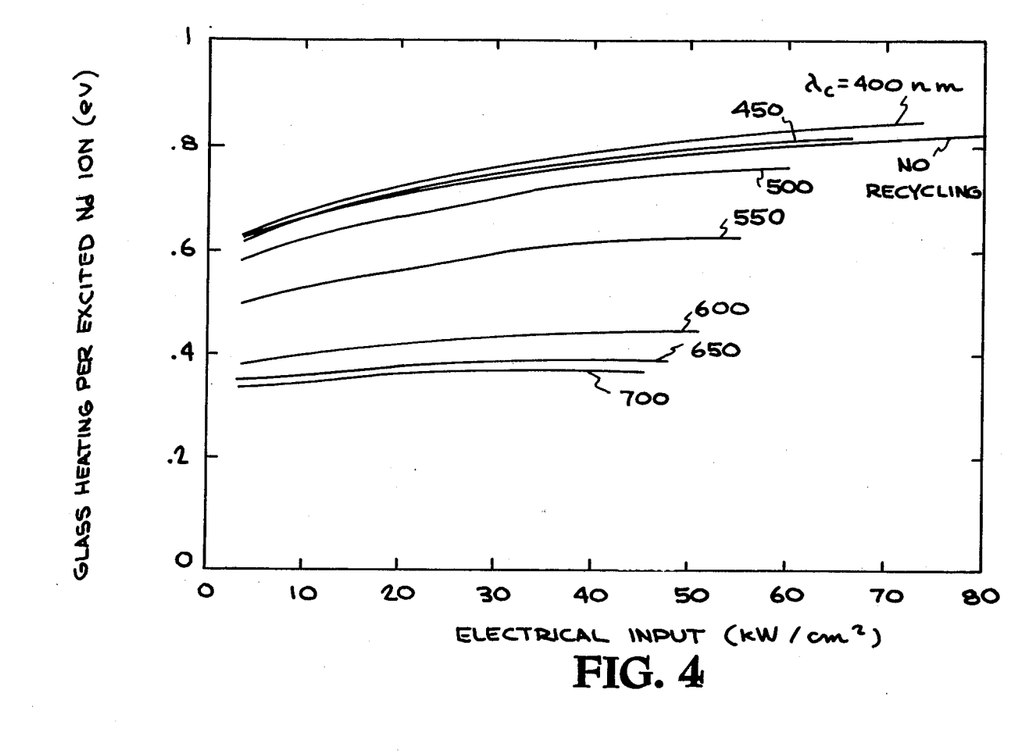
FIG. 4 is a graphic view of thermal energy deposition per excited Nd* ion (expressed in eV per ion) in Nd:glass with doping-thickness product of $4 \times 10^{20}$ ions/cm$^2$, with and without recycling for wavelengths $\lambda < \lambda_c$.
Figure 5:
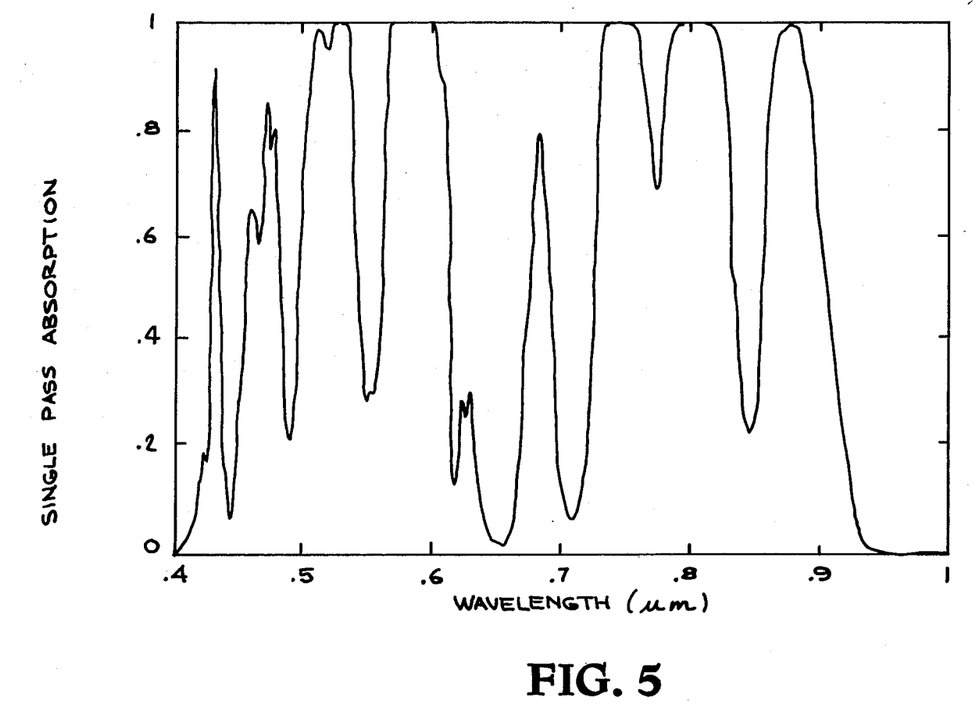
FIG. 5 is a graphic view of single-pass absorption of optical radiation in Nd:glass as a function of radiation wavelength, for doping-thickness product of $1.64 \times 10^{21}$ ions/cm$^2$.
Figure 6:
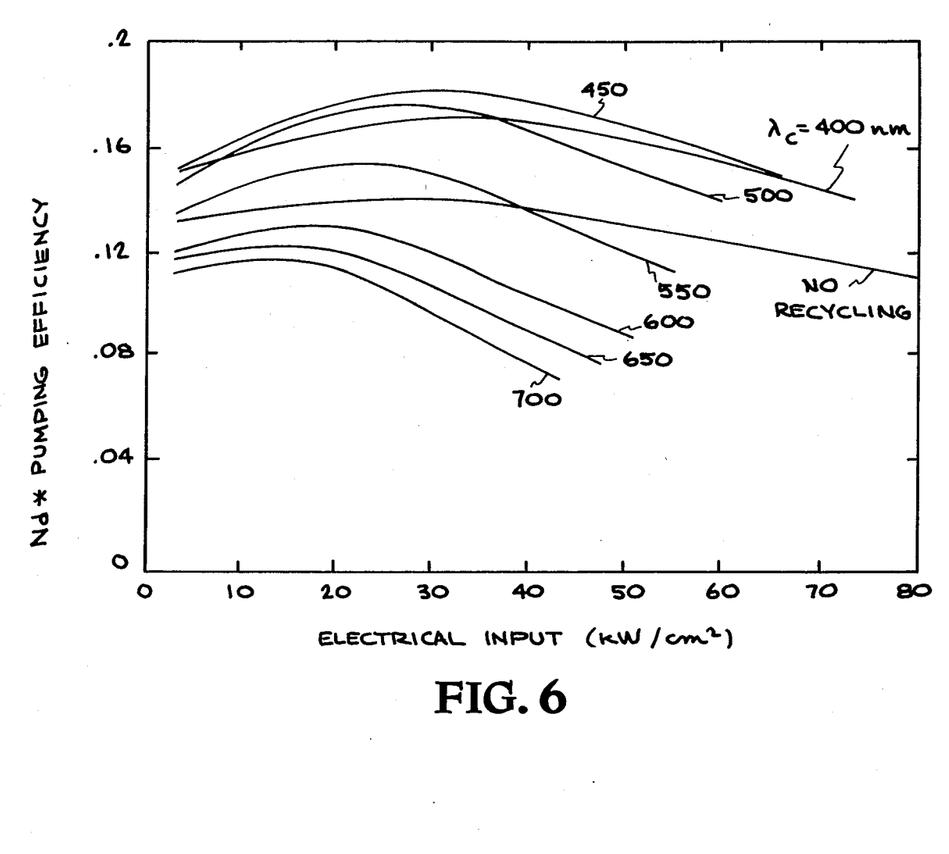
FIG. 6 is a graphic view of single pass pumping efficiency of Nd* ions in glass with a doping-thickness of $1.64 \times 10^{21}$ ions/cm$^2$, as a function of electrical input, with and without recycling of all photons with wavelengths $\lambda < \lambda_c$.
Figure 7:
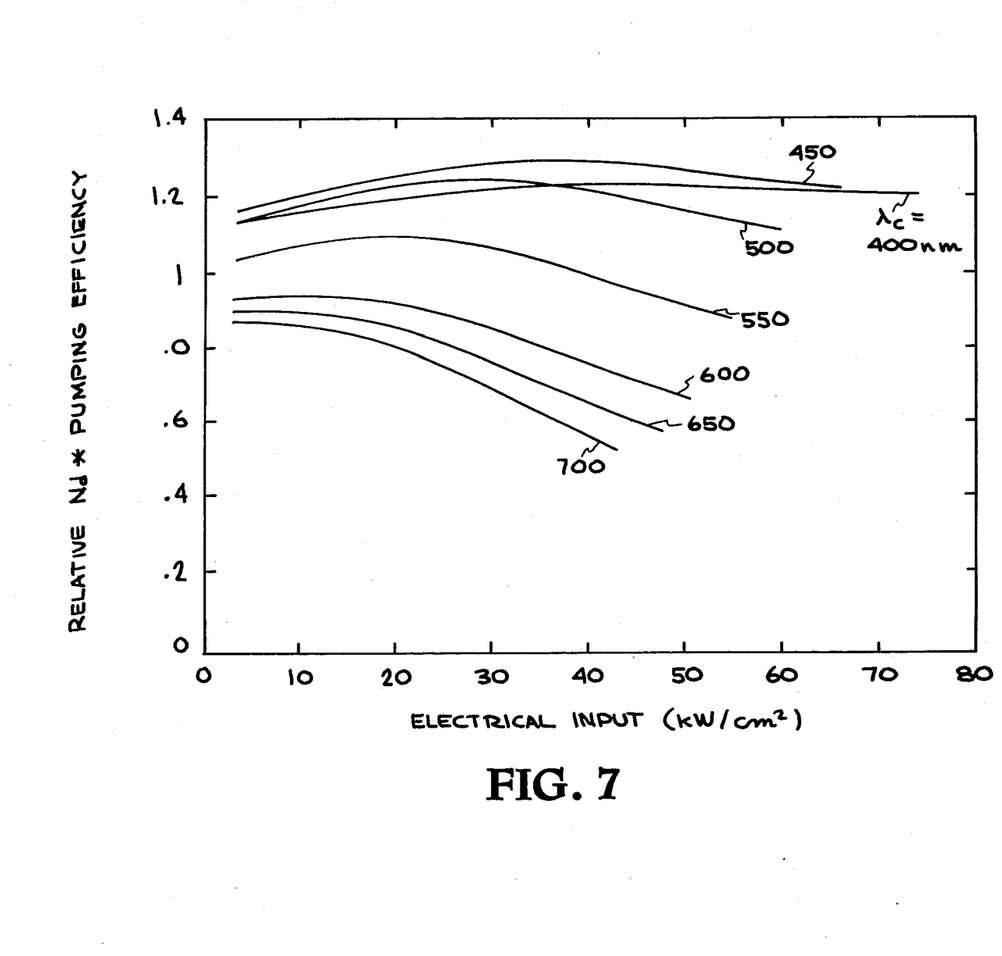
FIG. 7 is a graphic view of single pass relative pumping efficiency of Nd* ions in glass with and without recycling.
Figure 8:
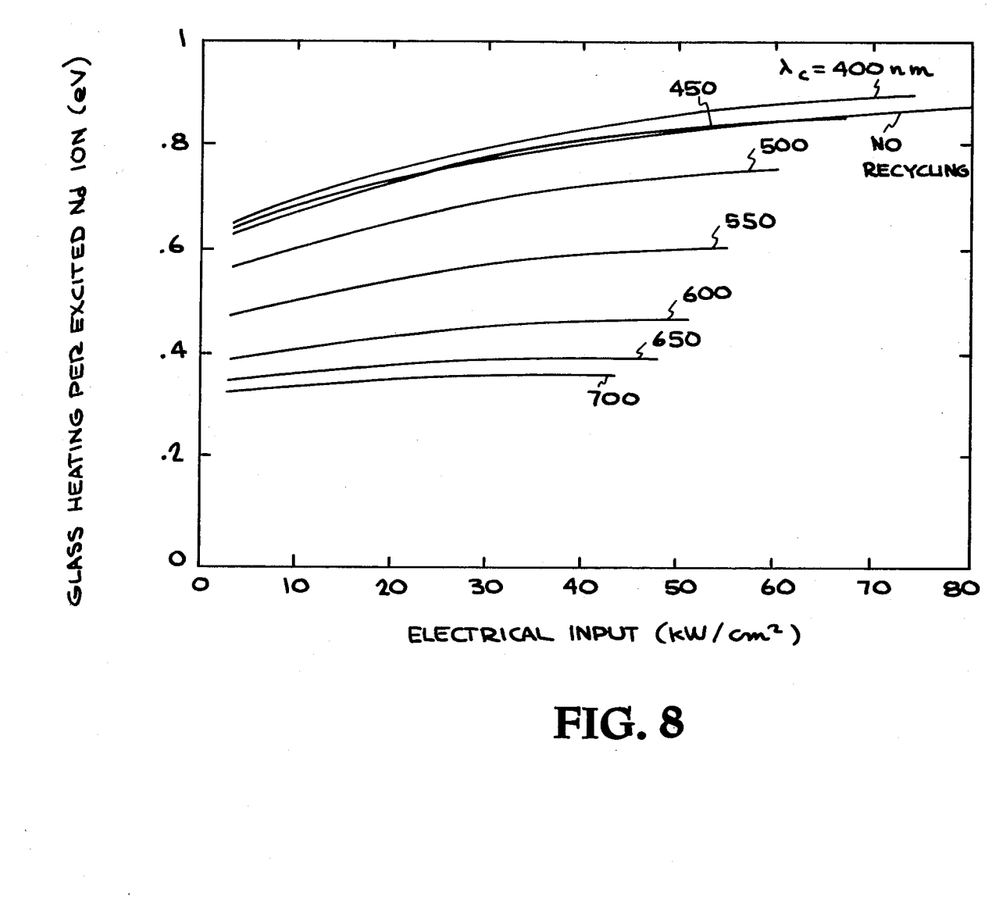
FIG. 8 is a graphic view of thermal energy deposition per excited ion Nd* in glass, with a doping-thickness product of $1.64 \times 10^{21}$ ions/cm$^2$, with and without recycling for wavelengths $\lambda < \lambda_c$.

The calculated glass heating per excited ion is plotted as a function of the electrical input in FIG. 4. At the two lowest values of $\lambda_c$, the heating increased slightly compared to the case with no recycling, since the blue-shift in the effective lamp output more than compensates for the relatively small increase in the average quantum efficiency in this case. At higher values of the cut-off wavelength the reduced quantum defect due to the forced lamp emission at longer wavelengths dominates, and the calculated heating with recycling decreases; for a cut-off around 700 nm, it is roughly half that obtained under the assumption of no recycling. However, as shown in FIGS. 3 and 4, this reduced heat load is produced with only a modest loss in pumping efficiency, approximately ten percent at the power inputs of interest ($\leq 20$ kw/cm$^2$).

The corresponding results for the calculations at the higher doping-thickness product $\rho w = 1.64 \times 10^{21}$ ions/cm$^2$ are displayed in FIGS. 5 through 8. The increased absorption in the pump band at 475 nm causes the case at $\lambda_c = 450$ nm to have the highest efficiency at all values of the lamp input. Aside from the absolute magnitude of the pumping and heating terms, the only other difference between the results of the calculation at the two values of $\rho w$ is that in the latter case the vertical displacement between the curves at different values of the cut-off wavelength is greater. This is again due to the increase in the glass absorption.

In conclusion, these relatively simple calculations indicate that the use of the appropriate reflective coating on a xenon flashlamp could increase its Nd* pumping efficiency by as much as 30%, or decrease the relative glass heating by as much as 50%. This reduction of glass heating ideally can occur with at most a ten percent loss in pumping efficiency. It should be pointed out that the idealized nature of this calculation (e.g., the assumption of unity transfer efficiency from reflected radiation to plasma input and the neglect of any absorption in the lamp wall or coating) indicates that the improvements obtained in actual operation will be somewhat smaller.

Figure 9:
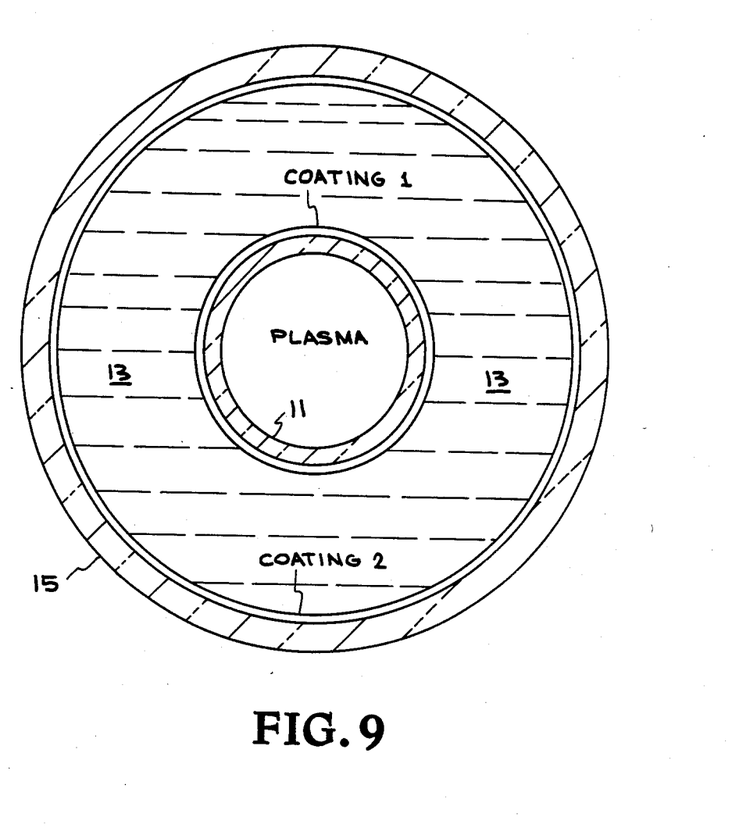
FIG. 9 is a schematic view of a double envelope embodiment of the invention, where different coatings may be applied to different surfaces of the envelopes.

The pumping efficiency may be further increased by use of a band filter coating on the flashlamp envelope that selectively reflects (and returns to the flashlamp plasma) all radiation with wavelength $\lambda < \lambda_1$, or $\lambda > \lambda_2$, where $\lambda_2$ is of the order of the highest wavelength that will pump the dopant. For Nd:YAG or Nd:glass, $\lambda_2 = 0.94$ μm and the fraction of initial wavelength radiation with $\lambda > \lambda_2$ is 16–18 percent. Use of such a long-wavelength reflective coating could compensate for any losses in pumping efficiency caused by use of a short wavelength coating to reduce the thermal load in the laser medium.

where the flashlamp envelope has more than one (preferably concentric) surface that may be coated, the invention may be extended to coatings on more than one such surface, each coating being chosen to transmit and reflect radiation in a different spectral range. This would ease the problem of applying more than one (different) coating to tailor the transmitted radiation since different, possibly incompatible, coatings could be applied to different surfaces. For example, one such coating might reflect (transmit) substantially all radiation with wavelength $\lambda < \lambda_1$ ($\lambda > \lambda_1$), and another such coating might reflect (transmit) all radiation with wavelengths $\lambda > \lambda_2$ ($\lambda < \lambda_2$) with $\lambda < \lambda_2$; simultaneous application of these coatings would recycle (once) all radiation with wavelengths outside the range $\lambda_1 < \lambda < \lambda_2$. An example of this arrangement is shown in FIG. 9, wherein the flashlamp radiation is originally produced within the cylindrical envelope 11 and the annular concentric region 13 defined by the two transparent envelopes 11 and 15 is filled with another radiation-transmitting fluid such as water.

The flashlamp envelope coatings may be placed on the exterior or the interior of the envelope. If the coating is placed on the interior surface of the plasma envelope, the coating lifetime may be quite short, and the coating material may be degraded by chemical reactions with the flashlamp plasma constituents. The coating material itself may be a combination of alternating multilayers of SiO$_2$ with certain oxides or fluorides such as HfO$_2$, Sc$_2$O$_3$, ZrO$_2$, ThO$_2$, Y$_2$O$_3$, MgO, Al$_2$O$_3$, YF$_3$, MgF$_2$, LaF$_3$, ThF$_4$ and Na$_3$AlF$_6$, for high reflectivity at wavelengths $\lambda \leq \lambda_c 32$ 350–550 nm, and alternating multilayers of Si with certain oxides such as Ta$_2$O$_5$ and Ti$_2$O$_3$, for high reflectivity at wavelengths $\lambda \geq \lambda_d \approx 900$ nm.

The foregoing description of preferred embodiments of the invention is presented for purposes of illustration only and is not intended to limit the invention to the precise form disclosed., modification and variation may be made without departing from what is regarded as the scope of the invention.

We claim:

1. A method of decreasing the thermal load generated in the matrix of a solid state laser, when the matrix is irradiated by a flashlamp, wherein flashlamp radiation is produced within a pair of flashlamp envelopes, that are spaced apart from one another in a cylindrically concentric relationship, and that are each substantially transparent to the flashlamp radiation, with minimal loss in flashlamp pumping efficiency, where the laser may be pumped only for wavelengths $\lambda$ less than an upper cut-off wavelength $\lambda_{co}$, the method comprising the steps of:

providing a first optical coating on either flashlamp envelope of the pair of flashlamp envelopes, that reflects a substantial portion of all radiation having wavelengths $\lambda$ less than a first predetermined wavelength $\lambda_c$ that lies in the range 0.35 $\mu$m $\leq \lambda_c \leq 0.7$ $\mu$m; and providing a second optical coating on the other flashlamp envelope of the pair of flashlamp envelopes, that reflects a substantial portion of all radiation with wavelengths greater than a second predetermined wavelength $\lambda_d$ and transmits radiation having wavelengths satisfying $\lambda_c < \lambda < \lambda_d$, where $\lambda_d \approx \lambda_{co}$.

2. The method of claim 1, further including the step of selecting said first optical coating from the class consisting of alternating multilayers of $SiO_2$ with $HfO_2$, $Sc_2O_3$, $ZrO_2$, $ThO_2$, $Y_2O_3$, $MgO$, $Al_2O_3$, $YF_3$, $MgF_2$, $LaF_3$, $ThF_4$ or $Na_3AlF_6$.

3. The method of claim 2, further including the step of selecting said second optical coating from the class consisting of alternating multilayers of $Ta_2O_5$ and $SiO_2$ and alternating multilayers of $Ti_2O_3$ and $SiO_2$.

* * * * *